US010776941B2

(12) United States Patent
Hollander et al.

(10) Patent No.: US 10,776,941 B2
(45) Date of Patent: Sep. 15, 2020

(54) OPTIMIZED NEURAL NETWORK STRUCTURE

(71) Applicant: Chiral Software, Inc., Beverly Hills, CA (US)

(72) Inventors: Eric Jonathan Hollander, Beverly Hills, CA (US); Michael Travis Remington, Seattle, WA (US)

(73) Assignee: Chiral Software, Inc., Beverly Hills, CA (US)

( * ) Notice: Subject to any disclaimer, the term of this patent is extended or adjusted under 35 U.S.C. 154(b) by 326 days.

(21) Appl. No.: 16/025,012

(22) Filed: Jul. 2, 2018

(65) Prior Publication Data

US 2020/0005482 A1 Jan. 2, 2020

(51) Int. Cl.
*G06T 7/73* (2017.01)
*G06K 9/00* (2006.01)
*G06N 3/08* (2006.01)
*G06T 7/246* (2017.01)

(52) U.S. Cl.
CPC ............ *G06T 7/73* (2017.01); *G06K 9/00744* (2013.01); *G06N 3/08* (2013.01); *G06T 7/248* (2017.01); *G06K 2009/00738* (2013.01); *G06T 2207/20081* (2013.01)

(58) Field of Classification Search
CPC ..... G06K 2009/00738; G06K 9/00744; G06K 9/00973; G06K 9/00993; G06K 9/3241; G06K 9/4628; G06N 3/0445; G06N 3/0454; G06N 3/08; G06T 2207/20081; G06T 7/248; G06T 7/73

See application file for complete search history.

(56) References Cited

U.S. PATENT DOCUMENTS 9,542,626 B2 1/2017 Martinson et al.
2019/0102646 A1* 4/2019 Redmon ............... G06K 9/4652

FOREIGN PATENT DOCUMENTS

CN 106886795 A 6/2017
EP 3267362 A1 1/2018

OTHER PUBLICATIONS

M.B. Bejiga, et al.; "A Convolutional Neural Network Approach for Assisting Avalanche Search and Rescue Operations with UAV Imagery"; remote sensing, 2017, 9, 100, pp. 1-22.

\* cited by examiner

*Primary Examiner* — Manuchehr Rahmjoo
(74) *Attorney, Agent, or Firm* — Young Basile Hanlon & MacFarlane, P.C.

(57) ABSTRACT

A method for performing real-time recognition of objects includes receiving an input video stream from a camera, pre-processing a current frame of the input video stream using one or more pre-processing layers of a neural network structure, detecting if there is an object in the current pre-processed frame using an auxiliary branch of the neural network structure, recognizing one or more objects in the current pre-processed frame using a primary branch of the neural network structure if an object is detected in the current pre-processed frame, and displaying the one or more recognized objects of the current frame in one or more bounding boxes.

18 Claims, 4 Drawing Sheets

OPTIMIZED NEURAL NETWORK STRUCTURE

FIELD OF THE DISCLOSURE

The present disclosure relates generally to object recognition systems, and more particularly to systems and methods for object recognition using an optimized neural network structure.

BACKGROUND

Object recognition is a technology in the field of computer vision for finding and identifying objects in an image or video sequence. Typically, an object recognition model is a machine learning model related to computer vision and image processing that deals with detecting instances of semantic objects of a certain class (such as humans, buildings, or cars) in digital images and videos. Convolutional Neural Networks (CNNs) are the premier algorithm used in the object recognition.

Standard CNNs consist of a series of layers that perform mathematical computations on an image. The recognizing and classifying of objects into fine grained categories requires a deep CNN with many layers. Each layer requires millions of floating point operations, and also requires memory access by corresponding Central Processing Unit (CPU). A disadvantage with existing CNNs is that they fully process every camera frame. This results in wasted computation on frames with no relevant objects. As a result, the powerful, accurate object recognizers become slow, and require specialized hardware such as Graphic Processing Units (GPUs) for performing object recognition.

Further, for live video data, running a real-time object recognition model is computationally expensive and usually requires powerful hardware such as GPU. In an example, typical moving systems, such as cars or unmanned aerial vehicles (UAVs) must perform object-recognition in real time, and without network (cloud computing) resources. These platforms typically have limited processor capacity, particularly on UAVs, which are highly constrained by weight and power availability. In a further example, in a typical tactical video security system, real-time video information has to be made available to the end users on their mobile devices with a latency of less than one second. An isolated imaging device, such as a drone system that does not have a robust network connection, or a security camera that is not connected to a high-speed internet connection, may be referred to as an edge device. The major problem that edge devices have, as opposed to cloud video analysis systems, is a lack of processing power to run complex models, such as, for example, neural networks.

In view of the above, there is a need for an object recognition system that is less computationally complex and has increased speed and accuracy. The object recognition system should allow for smooth object-recognition output on less powerful hardware such as edge devices and small computers that lack Graphic processing units (GPUs), so as to save computational resources and electricity costs, and therefore achieve longer operating time, especially on battery operated portable devices.

SUMMARY

In an embodiment of the present disclosure, a method for performing real-time recognition of objects is provided. The method may include receiving an input video stream from a camera. The method may include pre-processing a current frame of the input video stream using one or more pre-processing layers of a neural network structure. The method may further include detecting if there is an object in the current pre-processed frame using an auxiliary branch of the neural network structure. The method may further include recognizing one or more objects in the current pre-processed frame using a primary branch of the neural network structure, if an object is detected in the current pre-processed frame. The method may further include displaying the one or more recognized objects of the current frame in one or more bounding boxes.

In an embodiment of the present disclosure, a system for performing real-time recognition of objects is provided. The system includes a camera to generate an input video stream and an object recognizer implemented through a neural network structure. The neural network structure may include one or more pre-processing layers configured to pre-process a current frame of the input video stream. The neural network structure may further include an auxiliary branch configured to detect if there is an object in the current pre-processed frame. The neural network structure may further include a primary branch configured to recognize one or more objects in the current pre-processed frame, if an object is detected in the current pre-processed frame. The system may further include a display device configured to display the one or more recognized objects in the current frame in one or more bounding boxes.

A computer programmable product for performing real-time recognition of objects is provided. The computer programmable product comprises a set of instructions, wherein the set of instructions when executed by a processor causes the processor to receive an input video stream from a camera and pre-process a current frame of the input video stream using one or more pre-processing layers of a neural network structure. The set of instructions may further cause the processor to detect if there is an object in the current pre-processed frame using an auxiliary branch of the neural network structure and recognize one or more objects in the current pre-processed frame using a primary branch of the neural network structure, if an object is detected in the current pre-processed frame. The set of instructions may further cause the processor to display the one or more recognized objects of the current frame in one or more bounding boxes.

Various embodiments of the present disclosure perform real-time recognition of objects using an optimized neural network structure, wherein the optimized neural network structure includes an auxiliary branch that branches off from a primary branch. The auxiliary branch is a unique aspect of the neural network structure that detects the presence of an object from a low-level neural network layer. The novel mechanism does not proceed with the rest of the primary branch of the neural network unless the auxiliary branch returns a positive response. The auxiliary branch may begin at any arbitrary layer in the neural network, and makes an early prediction about whether processing should move on to the deeper layers of the neural network. Based on absence of useful detection, processing at higher levels may be withheld. The goal is to abort the processing as early as possible to save time, and to greatly increase the performance of deep networks by making an early decision about whether processing should move on to the deeper (and more expensive) layers.

Unlike the primary branch, the auxiliary branch does not classify objects, but simply predicts if there is anything in the input frame that the primary branch could classify. This greatly reduces computations and enables a deep neural network to work faster, therefore allowing more processing, and greater accuracy. Thus, the auxiliary branch reduces the recognition load of the primary branch and improves its accuracy, by triggering recognition only when an object is detected in an image frame. Various embodiments of the present disclosure may improve speed and efficiency of any Artificial Intelligence (AI) vision system that includes a Convolutional Neural Network (CNN).

Typical moving systems, such as cars or UAVs, must perform object recognition in real time, and without network (i.e., cloud computing) resources. These platforms typically have limited processor capacity, particularly on UAVs, which are highly constrained by weight and power availability. One aspect of real-time edge systems is limited CPU, combined with the need to classify objects quickly. A deep neural network puts a heavy burden on the processor (CPU or GPU). The present disclosure facilitates such constrained platforms to make optimal use of their processing and power by reducing recognizer load.

Due to increased efficiency, even in cases where a GPU-enabled computer runs an object detection model on a live security camera, the present disclosure allows the computer to process more simultaneous streams, or to use more complicated models on those streams, thereby saving computational resources and electricity costs on such object-detection system that runs on machine learning.

Various embodiments of the present disclosure find application in edge devices like drones and security cameras, which cannot stream data to a server for processing, do not have a high bandwidth network connection and do not have expensive and specialized GPU based hardware for complex computations, but the user needs to have a live camera view all the time. Thereby, allowing the battery-operated devices to run object detection software to save computational resources and therefore achieve longer operating time on a single charge, and also allowing for smooth object-detection output on less powerful hardware such as small computers that lack GPUs.

BRIEF DESCRIPTION OF DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present disclosure.

There may be additional components described in the foregoing application that are not depicted on one of the described drawings. In the event, such a component is described, but not depicted in a drawing, the absence of such a drawing should not be considered as an omission of such a design from the specification.

As required, detailed embodiments of the present disclosure are disclosed herein; however, it is to be understood that the disclosed embodiments are merely exemplary of the disclosure, which can be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure. Further, the terms and phrases used herein are not intended to be limiting but rather to provide an understandable description of the disclosure.

Figure 1:
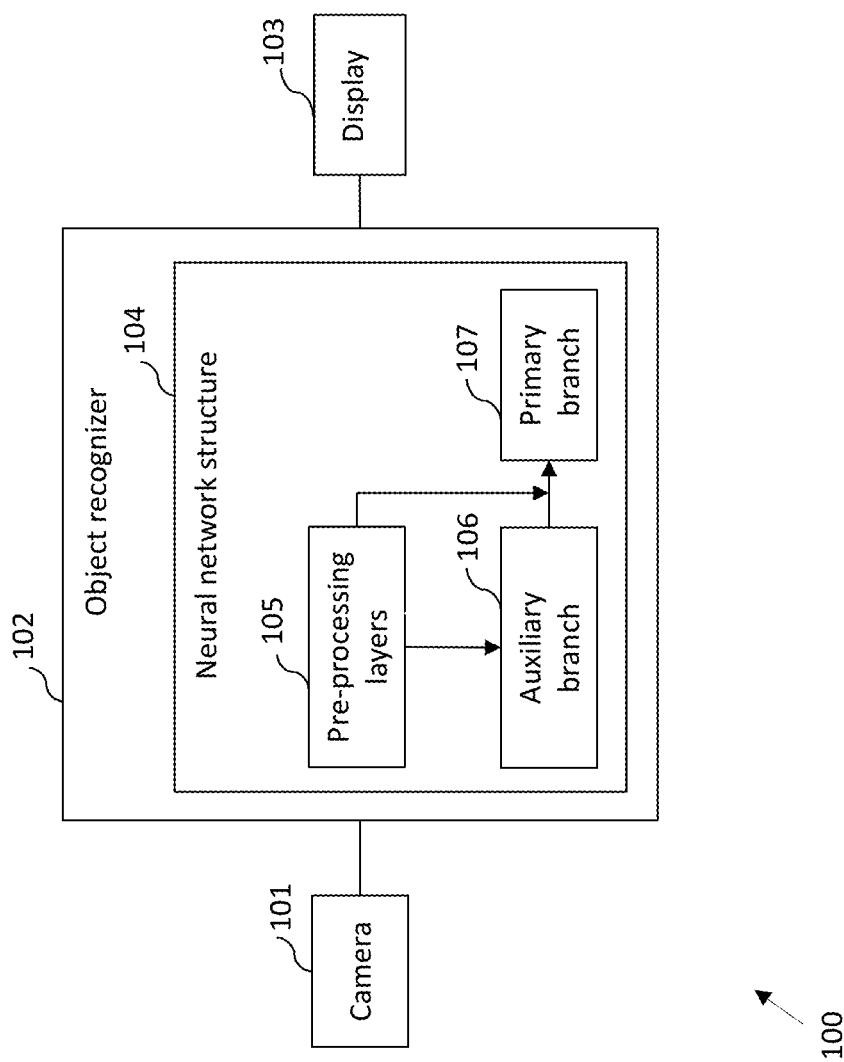
FIG. 1 is a schematic block diagram illustrating a system for real-time recognition of objects, in accordance with an embodiment of the present disclosure.

Referring now to FIG. 1, a schematic block diagram of a system 100 for performing real-time recognition of objects, in accordance with an embodiment of the present disclosure, is shown. The system 100 includes a camera 101, an object recognizer 102, and a display 103. The object recognizer 102 is configured to perform real-time recognition of objects captured by the camera 101, and display the recognition results on the display 103. Examples of the display 103 include, but are not limited to, an LCD display, an LED display, or the like.

Optionally, the system 100 may include a motion detector (not shown) configured to detect if a motion has occurred in a video frame, and provide only those frames to the object recognizer 102, in which motion has been detected, and also an object tracker (not shown) configured to track objects detected by the object recognizer 102. Optionally, the system 100 may further include a depth mapping module (not shown) configured to receive streams of video input from the camera 101, and generate depth maps for each image frame, such that the object recognizer 102 recognizes one or more objects in each image frame based on corresponding depth maps.

The object recognizer 102 is connected to the camera 101 either physically through a universal serial bus (USB), or through a communication network. The communication network may be any suitable wired network, wireless network, a combination of these or any other conventional network, without limiting the scope of the present disclosure. Few examples may include a Local Area Network (LAN), wireless LAN connection, an Internet connection, a point-to-point connection, or other network connection and combinations thereof.

The camera 101 is configured to capture and store the video of one or more objects in real-time. Examples of the camera 101 include, but are not limited to a remote battery-powered surveillance camera, a home security camera with a remote control via a home computer or a phone application, a traffic camera, a home doorbell camera, a body camera for soldiers or law enforcement, and a camera on an unmanned aerial vehicle (UAV).

In an embodiment, the camera 101, the object recognizer 102, and the display 103 may be integrated in a single device, where the single device is a portable smartphone having a built-in camera and a display.

In another embodiment, the camera 101 and the display 103 may be external to the object recognizer 102 and coupled thereto through the communication network, where the object recognizer 102 is a custom Graphic processing unit (GPU) server software to provide real-time object detection for all cameras on a local network.

In yet another embodiment, the camera 101 may be an IP camera external to the object recognizer 102 and the display 103, and coupled thereto through the communication network.

In yet another embodiment, the object recognizer 102 is a processing device that does not include a GPU, and includes limited CPU capabilities to run real-time object recognition process. Such object recognizer 102 may be either integrated with the camera 101 and the display 103 in a single device, or locally connected to the camera 101 and the display 103. The camera 101 may be known as an edge device, as any portable device with a CPU can be referred to as an edge device.

In an embodiment of the present invention, the object recognizer 102 performs object-recognition in one or more images using a neural network structure 104. The neural network structure 104 is a machine learning model related to computer vision and image processing that deals with detecting instances of semantic objects of a certain class (such as humans, buildings, or cars) in digital images and videos. In an example, the neural network structure 104 is a convolutional neural network (CNN) when the input includes images. In another example, the neural network structure 104 is a recurrent neural network (RNN) when the input is a time series input. In yet another example, the neural network structure 104 is a deep neural network when the input is a numerical input. The neural network structure 104 may use an advanced real-time variant of open-source object detection algorithm, and the initial implementation may be written in a suitable programming language, examples of which include, but are not limited to, Java, C, C+ and Python.

In an embodiment of the present disclosure, the neural network structure 104 is formed of pre-processing layers 105 configured to receive and perform one or more pre-processing steps on an input frame, an auxiliary branch 106 configured to receive the pre-processed frame and detect if there is an object present therein, and a primary branch 107 configured to proceed with recognizing objects in the pre-processed frame, if the auxiliary branch 106 detects the presence of an object therein. In another embodiment, the primary branch 107 does not proceed with recognizing the objects in the pre-processed frame if the auxiliary branch 106 does not detect an object in the input frame.

In an embodiment, each of the three components 105-107 could exist on a single physical computer, or on more than one computer and communicate through messaging protocols. If the three components run on a single computer, they could run in separate processes that communicate via communication protocols. If they run within a single process, they might run as threads. A thread is the smallest unit of processing that can be performed in an operating system. In most modern operating systems, a thread exists within a process, that is, a single process may contain multiple threads. If running in a single process, they could also use a reactive design, enabling the components to share one or more threads. The components 104-108 may be implemented in a programming language.

The object recognizer 102 may transmit the object recognition results to other components for further processing, storage, or such as the user interface for display. In an example, the coordinates and label of recognized objects may be sent as a message along with the video frames, to display labels and/or bounding boxes on live video streams on the display 103, or the coordinates and labels may be stored with the frames, or used for transmitting alerts, or other purposes. In one embodiment, the object recognizer 102 may generate a video output for display in which bounding boxes are drawn around detected objects, and/or a pixel mask is formed on the exact object detected, or substantially exact object detected.

Figure 2:
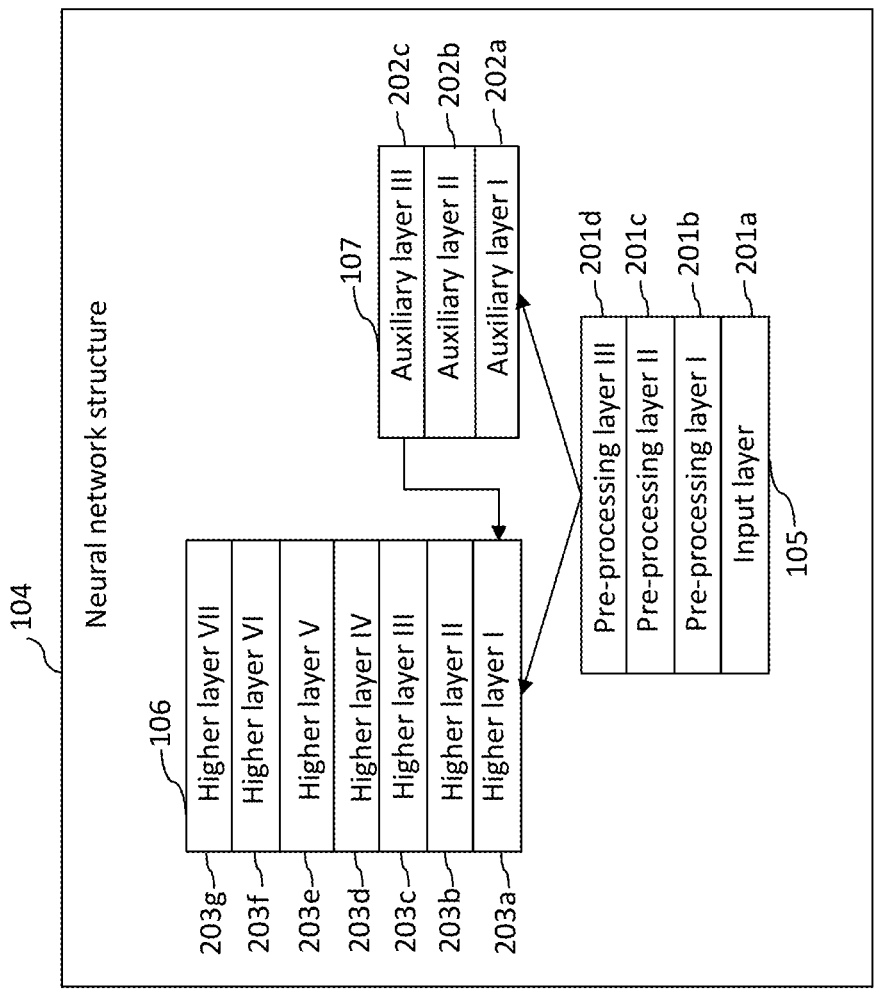
FIG. 2 illustrates a detailed view of the neural network structure of FIG. 1, in accordance with an embodiment of the present disclosure.

FIG. 2 illustrates a detailed view of the neural network structure 104, in accordance with an embodiment of the present disclosure.

The neural network structure 104 is depicted to have multiple processing layers, where each top layer processes an output generated by corresponding bottom layer. The bottom most layer is an input layer 201a that receives an input frame from the camera 101. The layer above the input layer 201a is a first pre-processing layer 201b that may process the input frame to detect primitive features, such as edges therein. The layer above the first pre-processing layer 201b is a second pre-processing layer 201c that may aggregate detected features into primitive shapes or parts of shapes. Although, three pre-processing layers have been illustrated herein for the sake of brevity, it would be obvious to one of ordinary skill in the art, that the number of pre-processing layers may be greater than or less than three.

Figure 3:
FIG. 3 illustrates an output of the pre-processing layers of the neural network structure for an input image.

FIG. 3 illustrates an output of the pre-processing layers 105 of the neural network structure 104 for an input image 300.

The output of the pre-processing layers 105 for the input image 300 may be a 64-dimensional tensor 302, where the 64-dimensional tensor includes 64 separate 2-dimensional "slices" of the tensor that could be visualized as a stack of 64 individual images.

Referring back to FIG. 2, the auxiliary branch 107 may include first through third auxiliary layers 202a till 202c (hereinafter referred to as auxiliary layers 202), where the auxiliary layers 202 are configured to receive the pre-processed frame from the third pre-processing layer 201d, and determine if an object is present therein. In an embodiment of the present disclosure, the third auxiliary layer 202c generates a binary output, which is logic high, i.e. 1, if an object is detected in the pre-processed frame, and is logic low, i.e. 0, if an object is not detected in the pre-processed frame. The third auxiliary layer 202c provides the binary output to the primary branch 106.

In an embodiment of the present invention, the auxiliary branch 107 may be trained as follows: An image data set may be processed by an already trained primary branch 106. For each image, the primary branch 106 may save the output of the preprocessing layers as a tensor with a corresponding label. For an image, if the primary branch 106 may find an object with a confidence over a specified threshold, then the label is referred to as one, else the label is referred to as zero. In an example, if the primary branch 106 detects a dog with a confidence of 80%, and the threshold is 50%, then the tensor may be labeled as 1. This means that during training, the auxiliary branch 107 is likely to learn that the tensor with label one is a good candidate for further processing. Thus, a set of tensors and corresponding labels may be generated for a set of images, and the auxiliary branch 107 may be trained on this data set.

Although, three auxiliary layers have been illustrated herein for the sake of brevity, it would be obvious to one of ordinary skill in the art, that the number of auxiliary layers may be greater than or less than three.

In an embodiment of the present disclosure, the primary branch 106 includes first through seventh higher layers 203*a* till 203*g* (hereinafter referred to as higher layers 203), where the higher layers 203 are deeper layers configured to perform increasingly abstract operations and recognize one or more objects in the input frame. The primary branch 106 may be similar to the neural network structure used in existing object recognition technologies. In an example, the primary branch 106 may include an existing pre-trained model, including common image classifiers.

In an embodiment of the present disclosure, the first higher layer 203*a* processes the output generated by the third pre-processing layer 201*d* for object recognition, if the binary output generated by the auxiliary branch 107 is logic high. Then, the second higher layer 203*b* processes the output generated by the first higher layer 203*a*, and so on. The output of the seventh higher layer 203*g* may include names and categories of one or more recognized objects, and/or coordinates of one or more recognized objects in the input frame. In an example, the primary branch 106 may output a class of the recognized object such as person, dog, car, etc. Although, seven higher layers have been illustrated in the primary branch 106 for the sake of brevity, it would be obvious to one of ordinary skill in the art, that the number of higher layers may be greater than or less than seven.

In another embodiment of the present disclosure, the primary branch 106 does not process the output generated by the third pre-processing layer 201*d* for object recognition, if the binary output generated by the auxiliary branch 107 is logic low. As a result, further processing of the current frame is aborted, and the pre-processing layers 105 start processing next frame. Thus, the primary branch 106 does not perform any processing of an image frame, if no object is likely to be found in that frame. This massively reduces computation time, as the auxiliary branch 107 makes an early prediction about whether the processing should continue to deeper/higher layers of the primary branch 106.

In an embodiment of the present disclosure, the auxiliary branch 107 is a neural network that branches off from another neural network such as the primary branch 106. Unlike the primary branch 106, the auxiliary branch 107 does not classify objects, but simply predicts if there is anything in the input frame that the primary branch 106 could classify.

The architecture of the auxiliary branch 107 can be customized for a balance between speed and accuracy based on the selection of the pre-processing layer after which the auxiliary branch 107 starts, as this layer is shared between both the primary branch 106 and auxiliary branch 107. For instance, if the number of pre-processing layers is high, then the neural network structure 104 would become more accurate, but slower.

In various embodiments of the present disclosure, the architecture of the auxiliary branch 107 can be customized to any combination and configuration of neural network layers, as long as the final layer of the auxiliary branch 107 computes a binary prediction. In an example, if the auxiliary branch 107 is longer, i.e. it contains more layers, the output of the auxiliary branch 107 may be more accurate, but the processing time may increase. Similarly, if the auxiliary branch 107 is shorter, i.e. it contains lesser layers, the output of the auxiliary branch 107 may be less accurate, but the processing time may decrease.

In an example, if an input frame includes an image of a room that is dark, the pre-processing layers 105 may not be able to detect any features. The auxiliary branch 107 may be trained to detect an absence of useful detections and then withhold processing of the input frame by the primary branch 106. This greatly reduces unnecessary computations. Thus, the auxiliary branch 107 reduces the recognition load of the primary branch 106 and improves its accuracy, by triggering recognition only when an object is detected in an image frame.

It may be noted that each "neuron" in the neural network structure 104 contains numbers called weights and biases. These may be collectively referred to as parameters. During processing, the weights may be multiplied against the input and the biases may be added. In an example, when the input frame includes an image of a room that is dark and the auxiliary branch 107 aborts further processing of the input frame by the primary branch 106, then number of parameters from the input layer 201*a* to an end of the primary branch 106 may be '46,091,160'. Similarly, the number of parameters from the input layer 201*a* to an end of the auxiliary branch 107 may be '1,358,289'. This means that if processing is aborted on an empty frame at the end of the auxiliary branch 107, then there may be a 97% decrease in parameters used in computation.

In an embodiment of the present disclosure, the neural network 104 may receive an entire image frame as an input, or a cropped image frame (also referred to as sub-frame) as an input. The sub-frames may be generated by using a sliding window over the entire image frame. The auxiliary branch 107 may assign probability of successful object recognition to image frames, sliding windows, or other non-image inputs. In an embodiment, the auxiliary branch 107 may classify a series of input frames and then sort the input frames based on probability of being a good candidate (having any object), so that the best frames are processed by the main branch first 106. This list of input frames may be continuously sorted as new frames come in. This way resources can be put to best use first. If, at a later time during analysis, additional input becomes available which has higher probability than other items in the queue, the higher probability items may go ahead in the queue.

Applications of the Present Disclosure:

A UAV may install the system of the present disclosure to detect objects that come in its way in real-time and make navigation decisions in real-time based on detected objects.

A drone, with an existing single camera sensor may install the system of the present disclosure to more accurately recognize objects.

A government or corporate facility installs the system of the present disclosure with edge processing. An attacker comes in with a weapon. The system, in real time, identifies a visible weapon (a rifle etc.) and alerts security. The security team arrives and uses their smartphones to get real-time views from the security cameras. Due to the real-time edge processing, the application shows the responders only the relevant images to see, out of the hundreds of cameras that may be in the building.

Figure 4:
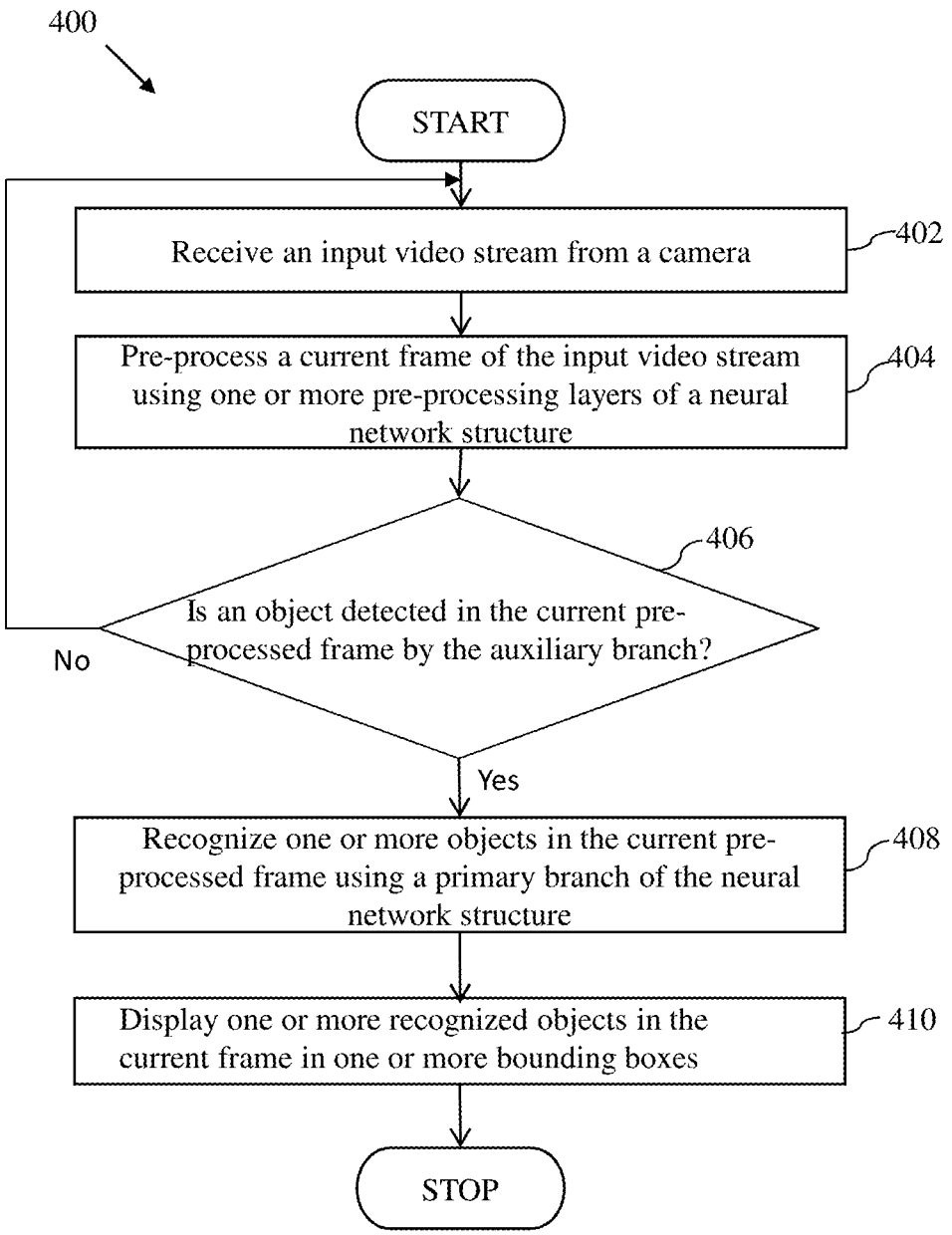
FIG. 4 is a flow chart to illustrate a method for real-time recognition of objects, in accordance with an embodiment of the present disclosure.

FIG. 4 is a method flowchart 400 for real-time recognition of objects, in accordance with an embodiment of the present disclosure. Some steps may be discussed with respect to the system as shown in FIG. 1.

At step 402, an input video stream is received from a camera. Examples of the camera include, but are not limited to a remote battery-powered surveillance camera, a home security camera with a remote control via a home computer or a phone application, a traffic camera, a home doorbell camera, a body camera for soldiers or law enforcement, and a camera on an unmanned aerial vehicle (UAV).

At step 404, a current frame of the input video stream is pre-processed using one or more pre-processing layers of a neural network structure. A pre-processing layer may process the input frame to detect primitive features, such as edges therein, and a further pre-processing layer may aggregate detected features into primitive shapes or parts of shapes.

At step 406, it is checked by an auxiliary branch of the neural network if there is an object in the current pre-processed frame. The auxiliary branch is a neural network that branches off from another neural network such as a primary branch. Unlike the primary branch, the auxiliary branch does not classify objects, but simply predicts if there is anything in the input frame that the primary branch could classify.

At step 408, one or more objects are recognized in the current pre-processed frame using a primary branch of the neural network structure, if an object is detected in the current pre-processed frame. The primary branch is related to computer vision and image processing that deals with detecting instances of semantic objects of a certain class in digital images and videos.

At step 410, the one or more recognized objects are displayed in the current frame in one or more bounding boxes. In an embodiment, the co-ordinates (location) and label (identification) may be displayed on live video streams, or may be stored with corresponding frame, or used for transmitting alerts, or other purposes.

The present disclosure may be implemented in the form of a computer programmable product for performing real-time recognition of objects. The computer programmable product includes a set of instructions, the set of instructions when executed by a processor causes the processor to perform the methods as discussed with FIG. 4.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor and a memory may be used to implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without deviating from the scope of present disclosure.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

The invention claimed is:

1. A method for performing real-time recognition of objects, the method comprising:
    receiving an input video stream from a camera;
    pre-processing a current frame of the input video stream using one or more pre-processing layers of a neural network structure;
    detecting if there is an object in the current pre-processed frame using an auxiliary branch of the neural network structure;
    recognizing one or more objects in the current pre-processed frame using a primary branch of the neural network structure, if an object is detected in the current pre-processed frame; and
    displaying the one or more recognized objects of the current frame in one or more bounding boxes;
    simultaneously tracking a location of a recognized object within a corresponding frame from a latest coordinate of the recognized object, while the object recognition continues for one or more objects;
    generating a tracking box and overlaying the tracking box on the recognized object and then transmitting the video stream for display; and
    continuing the tracking of the recognized object till the object recognition continues for a corresponding object of the one or more objects.

2. The method of claim 1, wherein the camera is selected from at least one of: a traffic camera, a home doorbell camera, a body camera for soldiers or law enforcement, and a camera on an unmanned aerial vehicle (UAV).

3. The method of claim 1 further comprising pre-processing a next frame if an object is not detected in the current pre-processed frame.

4. The method of claim 1, wherein the pre-processing of the current frame of the input video stream comprises detecting primitive features and aggregating detected features into primitive shapes or parts of shapes.

5. The method of claim 1, wherein the auxiliary branch generates a binary output and provides the generated output to the primary branch, wherein the binary output is logic high, if an object is detected in the pre-processed frame, and is logic low if an object is not detected in the pre-processed frame.

6. The method of claim 1, wherein the neutral network structure is a convolutional neural network (CNN).

7. The method of claim 1 further comprising:
    detecting if a motion has occurred in a frame of the input video stream; and
    providing the frame to the neural network structure if the motion has been detected therein.

8. A system for performing real-time recognition of objects, the system comprising:
    a camera to generate an input video stream;
    an object recognizer implemented through a neural network structure, the neural network structure comprising:
        one or more pre-processing layers configured to pre-process a current frame of the input video stream;
        an auxiliary branch configured to detect if there is an object in the current pre-processed frame; and
        a primary branch configured to recognize one or more objects in the current pre-processed frame, if an object is detected in the current pre-processed frame; and
    a display device configured to display the one or more recognized objects in the current frame in one or more bounding boxes;

an object tracker configured to:
  simultaneously track a location of a recognized object within a corresponding frame from a latest coordinate of the recognized object, while the object recognition continues for one or more objects;
  generate a tracking box and overlay the tracking box on the recognized object and then transmit the video stream to the display device; and
  continue the tracking of the recognized object till the object recognition continues for a corresponding object of the one or more objects.

9. The system of claim 8, wherein the camera is selected from at least one of: a traffic camera, a home doorbell camera, a body camera for soldiers or law enforcement, and a camera on an unmanned aerial vehicle (UAV).

10. The system of claim 8, wherein the pre-processing of the current frame of the input video stream comprises detecting primitive features and aggregating detected features into primitive shapes or parts of shapes.

11. The system of claim 8, wherein the one or more pre-processing layers pre-process a next frame if an object is not detected in the current pre-processed frame.

12. The system of claim 8, wherein the pre-processing of the current frame of the input video stream comprises detecting primitive features and aggregating detected features into primitive shapes or parts of shapes.

13. The system of claim 8, wherein the neutral network structure is a convolutional neural network (CNN).

14. The system of claim 8 further comprising:
  a motion detector configured to:
    detect if a motion has occurred in a frame of the input video stream; and
    provide the frame to the object recognizer if the motion has been detected therein.

15. A computer programmable product stored on a non-transitory computer readable medium for performing real-time recognition of objects, the computer programmable product comprising a set of instructions, the set of instructions when executed by a processor causes the processor to:
  receive an input video stream from a camera;
  pre-process a current frame of the input video stream using one or more pre-processing layers of a neural network structure;
  detect if there is an object in the current pre-processed frame using an auxiliary branch of the neural network structure;
  recognize one or more objects in the current pre-processed frame using a primary branch of the neural network structure, if an object is detected in the current pre-processed frame;
  display the one or more recognized objects of the current frame in one or more bounding boxes;
  simultaneously track a location of a recognized object within a corresponding frame from a latest coordinate of the recognized object, while the object recognition continues for one or more objects;
  generate a tracking box and overlay the tracking box on the recognized object and then transmit the video stream to the display device; and
  continue the tracking of the recognized object till the object recognition continues for a corresponding object of the one or more objects.

16. The computer programmable product of claim 15, wherein the pre-processing of the current frame of the input video stream comprises detecting primitive features and aggregating detected features into primitive shapes or parts of shapes.

17. The computer programmable product of claim 15, wherein the auxiliary branch generates a binary output and provides the generated output to the primary branch, wherein the binary output is logic high, if an object is detected in the pre-processed frame, and is logic low if an object is not detected in the pre-processed frame.

18. The computer programmable product of claim 15, wherein the neutral network structure is a convolutional neural network (CNN).

* * * * *